(12) United States Patent  
Satterlee et al.

(10) Patent No.: US 8,582,474 B2  
(45) Date of Patent: Nov. 12, 2013

(54) VIDEO CONFERENCE SYSTEM AND METHOD

(75) Inventors: Michael Satterlee, Clifton Park, NY (US); Jamil Cheikhali, Tampa, FL (US); John F. Gibbons, Ballston Lake, NY (US); Jai Narayn Gosine, Hempstead, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

(21) Appl. No.: 12/964,232

(22) Filed: Dec. 9, 2010

(65) Prior Publication Data

US 2012/0147127 A1    Jun. 14, 2012

(51) Int. Cl.
*H04L 12/16* (2006.01)

(52) U.S. Cl.
USPC ............. 370/260; 348/14.08; 348/14.09; 348/14.11; 348/14.12; 370/352; 379/202.01; 709/201; 709/204; 709/220; 709/227

(58) Field of Classification Search
USPC ............. 348/14.01–14.16; 370/259–271, 370/351–357; 379/67.1–88.28, 201.01, 379/202.01; 709/201–207, 217–248
See application file for complete search history.

(56) References Cited

U.S. PATENT DOCUMENTS

| | | | |
|---|---|---|---|
| 5,689,553 A | 11/1997 | Ahuja et al. | |
| 6,404,745 B1 | 6/2002 | O'Neil et al. | |
| 7,079,495 B1 | 7/2006 | Pearce et al. | |
| 7,593,032 B2 * | 9/2009 | Civanlar et al. | 348/14.09 |
| 2005/0226172 A1 * | 10/2005 | Richardson et al. | 370/260 |
| 2007/0005804 A1 | 1/2007 | Rideout | |
| 2007/0277221 A1 * | 11/2007 | Davis et al. | 725/151 |
| 2009/0213206 A1 * | 8/2009 | Niu et al. | 348/14.09 |

OTHER PUBLICATIONS

U.S. Appl. No. 12/636,919, filed Dec. 14, 2009.
Appia Communications, Inc.—Appia Video Communicator—User Guide, 2009, 15 pp.
Vidyo, Inc.—Vidyo Components-System at http://www.vidyo.com/system/ns_vidyo_components.php, 2010, printed Oct. 28, 2010, 1 pp.
Vidyo, Inc.—"VidyoConferencing—High Definition Video from the Conference Room to the Desktop", 2010, 2 pp.
Vidyo, Inc.—"VidyoDesktop", 2010, 3 pp.
Vidyo, Inc.—"VidyoGateway", 2010, 4pp.

* cited by examiner

*Primary Examiner* — Hemant Patel
(74) *Attorney, Agent, or Firm* — Toler Law Group, PC

(57) ABSTRACT

A method includes receiving a registration message at a video control point (VCP) device, the registration message requesting set up of a video conference between endpoint devices. The video conference is set up to enable a first endpoint device to send media to a second endpoint device without the media passing through the VCP device en route. A communication profile associated with each endpoint device is determined. Configuration settings associated with at least one endpoint device is determined based on the communication profiles. The configuration settings are sent to at least one computing device that is adapted to modify the media based on the configuration settings to generate modified media.

20 Claims, 5 Drawing Sheets

VIDEO CONFERENCE SYSTEM AND METHOD

FIELD OF THE DISCLOSURE

The present disclosure is generally related to video conferencing.

BACKGROUND

When a service provider deploys a centralized video conferencing bridge to provide video conferencing services, video conference data from video conferencing terminals participating in a call may be sent to the centralized video conferencing bridge. The centralized video conferencing bridge may send select video conference data to the video conferencing terminals participating in the call. Such a centralized architecture may be inefficient because the video conference data from each of the video conferencing terminals participating in the call may be processed by the centralized video conferencing bridge. For example, when a video conference call uses fifteen megabytes per video conference terminal, a video conference involving three video conference terminals may use forty-five megabytes of bandwidth at the centralized video conferencing bridge to support the call. In addition to having large bandwidth requirements, a centralized video conferencing architecture may not scale easily and may have issues with service availability (e.g., due to a single point of failure).

DETAILED DESCRIPTION

Figure 1:
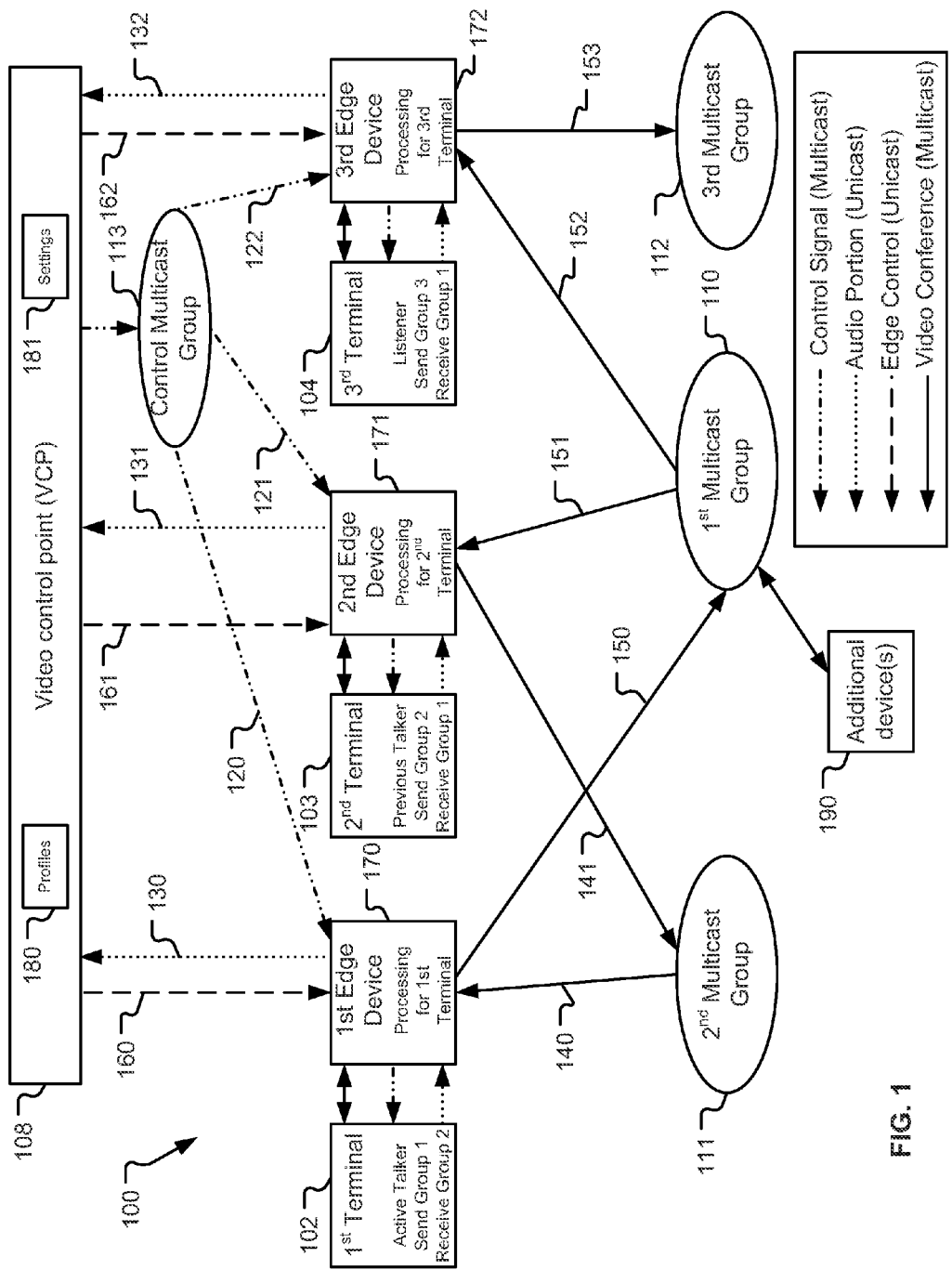
FIG. 1 is a block diagram of a first particular embodiment of a video conferencing system.

In a particular embodiment, a computer-implemented method includes receiving a registration message at a video control point device from a first endpoint device. The registration message requests set up of a video conference between the first endpoint device and at least one second endpoint device. In response to the registration message, the video conference is set up to enable the first endpoint device to send first media to the at least one second endpoint device without the first media passing through the video control point device en route to the at least one second endpoint device and to enable the at least one second endpoint device to send second media to the first endpoint device without the second media passing through the video control point device en route to the first endpoint device. The method also includes determining a first communication profile associated with the first endpoint device and determining at least one second communication profile associated with the at least one second endpoint device. The method further includes determining configuration settings associated with the first endpoint device based at least partially on the first communication profile and the at least one second communication profile. The method also includes sending the configuration settings to at least one computing device that is adapted to modify the second media based on the configuration settings to generate modified second media. The first endpoint device is able to utilize the modified second media. The second media is received by the at least one computing device en route from the at least one second endpoint device to the first endpoint device.

In another particular embodiment, a computer-readable storage medium includes instructions that, when executed by a processor, cause the processor to receive a registration message at a video control point device from a first endpoint device. The registration message requests set up of a video conference between the first endpoint device and at least one second endpoint device. In response to the registration message, the video conference is set up to enable the first endpoint device to send first media to the at least one second endpoint device without the first media passing through the video control point device en route to the at least one second endpoint device and to enable the at least one second endpoint device to send second media to the first endpoint device without the second media passing through the video control point device en route to the first endpoint device. The instructions are further executable to cause the processor to determine a first communication profile associated with the first endpoint device. The instructions are further executable to cause the processor to determine at least one second communication profile associated with the at least one second endpoint device. The instructions are further executable to cause the processor to determine configuration settings associated with the first endpoint device based at least partially on the first communication profile and the at least one second communication profile. The instructions are further executable to cause the processor to send the configuration settings to at least one computing device that is adapted to modify the second media based on the configuration settings to generate modified second media. The first endpoint device is able to utilize the modified second media. The second media is received by the at least one computing device en route from the at least one second endpoint device to the first endpoint device.

In another particular embodiment, a computing device includes a processor and a memory accessible to the processor. The memory includes instructions that, when executed by the processor, cause the processor to receive a registration message at a video control point device from a first endpoint device. The registration message requests set up of a video conference between the first endpoint device and at least one second endpoint device. In response to the registration message, the video conference is set up to enable the first endpoint device to send first media to the at least one second endpoint device without the first media passing through the video control point device en route to the at least one second endpoint device and to enable the at least one second endpoint device to send second media to the first endpoint device without the second media passing through the video control point device en route to the first endpoint device. The instructions are further executable to cause the processor to determine a first communication profile associated with the first endpoint device. The instructions are further executable to cause the processor to determine at least one second communication profile associated with the at least one second endpoint device. The instructions are further executable to cause the processor to determine configuration settings associated with the first endpoint device based at least partially on the first communication profile and the at least one second communication profile. The instructions are further executable to cause the processor to send the configuration settings to at least one computing device that is adapted to modify the second media based on the configuration settings to generate modified second media. The first endpoint device is able to utilize the modified second media. The second media is received by the at least one computing device en route from the at least one second endpoint device to the first endpoint device.

Referring to FIG. 1, a block diagram of a first particular embodiment of a video conferencing system using multicast and unicast transmissions is depicted and generally designated 100. The system 100 includes a plurality of video conference endpoints, such as a first terminal 102, a second terminal 103, and a third terminal 104, in communication with a Video Control Point (VCP) 108. The VCP 108 may include a computing device or a set of computing devices that facilitate decentralized video conference communications. The system 100 illustrates how the terminals 102-104 register with the VCP 108 and communicate with one another. The system 100 also illustrates set up of the video conference by the VCP 108, including configuration of one or more devices in a network, such as edge devices 170-172, through which video conference data is transmitted. Although three terminals 102-104 are illustrated in FIG. 1, the system 100 may be scaled to accommodate more than the three terminals 102-104.

The terminals 102-104 may be video conferencing terminals located in geographically dispersed video conferencing locations. The terminals 102-104 may be coupled to or integrated with a video capture device (e.g., video camera), a video display device, an audio capture device (e.g., microphone), a computing device, another conferencing-related device, or any combination thereof. In a particular embodiment, the terminals 102-104 have different capabilities. One or more of the terminals 102-104 generates or sends video conference data that is distinct from video conference data generated, sent or used by one or more of the other terminals 102-104. To illustrate, the first terminal 102 may be configured to send video data at a first display resolution and the second terminal 103 may be configured to receive or display video data at a second display resolution that is different than the first display resolution. The second terminal 103 may be limited to the second display resolution by hardware or software of the second terminal 103, a network connection of the second terminal 103, or a combination thereof. To accommodate limitations of the second terminal 103, the first terminal 102 may be able to reduce the display resolution of video data sent by the first terminal 102. However, when the third terminal 104 is able to receive and use video data at the first display resolution, reducing the display resolution of the video data sent by the first terminal 102 may be undesirable since this would unnecessarily reduce the display resolution of video data received at the third terminal 104.

In the system 100, the edge devices 170-172 may be configured by the VCP 108 to process data to be provided to each corresponding terminal 102-104. To illustrate, the first edge device 170 may process video conference data to be provided to the first terminal 102, the second edge device 171 may process video conference data to be provided to the second terminal 103, and the third edge device 172 may process video conference data to be provided to the third terminal 104. The VCP 108 may send data to each edge device 170-172 that configures the edge device to process the video conference data according to the capabilities or user configuration of the corresponding terminal 102-104. Thus, each terminal 102-104 can transmit video conference data according to its capabilities and configuration and each terminal 102-104 can receive video conference data from other terminals according to its capabilities and configuration. To illustrate, in the example described above, the first terminal 102 can send video data at the first display resolution, the second terminal 103 can receive the video data at the second resolution (after processing by the second edge device 171), and the third terminal 104 can receive the video data at the first display resolution. Display resolution is just one example of capabilities or configuration of the terminals 102-104 that may be different between two or more terminals. Other examples include, but are not limited to, frame rate, bandwidth, communication protocol used, and so forth.

To set up or join a video conference call, the terminals 102-104 may send requests to the VCP 108 to join the video conferencing call. The terminals 102-104 may communicate with the VCP 108 via a network (not shown) that includes the edge devices 170-172. For example, the terminals 102-104 may send data packets, such as Internet Protocol (IP) data packets, to the VCP 108 via the edge devices 170-172 and possibly one or more additional network devices. The data packets may be sent via multicast or via unicast transmission. For example, IP multicast may be used for one-to-many communication over an IP infrastructure in a network. Multicast may use network infrastructure efficiently because a source sends a packet only once, even when sending to a large number of receivers. Nodes of the network, such as edge devices 170-172, may replicate the packet to reach multiple receivers only as needed. Additionally, the edge devices 170-172 may process the contents of the data packets.

The edge devices 170-172 may be located at various physical or logical positions in the network. Thus, each of the edge devices 170-172 may include or may be co-located with other network devices, such as routers, switches, digital subscriber line access multiplexors, gateway devices (e.g., residential gateway devices), video conference provider servers, other network computing devices or nodes, or any combination thereof. The edge devices 170-172 may be physically and logically distinct from the VCP 108.

The VCP 108 may include a software program executing on a computing device. To set up a video conference call (e.g., in response to requests from one or more of the terminals 102-104), the VCP 108 may send instructions to the terminals 102-104, to the edged devices 170-172, to other devices of the network (not shown), or any combination thereof. For example, instructions sent to the terminals 102-104 may direct each of the terminals 102-104 to send video conference data to a particular multicast group (e.g. one of the multicast groups 110-112), to receive video conference data from a particular multicast group, to monitor a multicast control group 113, to perform other actions, or any combination thereof. The instructions sent to each of the edge devices 170-172 may direct the edge device to route data to or from the corresponding terminal in a particular manner (e.g., via a particular route), to process the video conference data in a particular manner, to perform other actions, or any combination thereof. The VCP 108 may also monitor terminals participating in the video conference call, such as the terminals 102-104, determine an active talker terminal, instruct the terminals to send video data to particular multicast groups, instruct the terminals to receive video data from particular multicast groups, and so forth. In a particular embodiment, at least a portion of the data exchanged by the terminals 102-104 (such as video data of the video conference call) does not pass through the VCP 108 en route between the terminals 102-104.

After a video conference has been set up, the VCP 108 may instruct the terminals 102-104 to send or receive data from particular multicast groups via a control multicast group 113. During the video conference, a terminal may send video conference data to a multicast group and another terminal may monitor (e.g., receive) video conference data from that multicast group. When a terminal is instructed to send video conference data to a particular multicast group, the particular multicast group may be referred to as a send multicast group for that terminal. When a terminal is instructed to monitor (e.g., receive) video conference data via a particular multicast group, the particular multicast group may be referred to as a receive multicast group for that terminal. For example, when the VCP 108 instructs the first terminal 102 to send video conference data 150 to a first multicast group 110, the VCP 108 may assign the first multicast group 110 as the send multicast group of the first terminal 102. When the VCP 108 instructs the first terminal 102 to monitor video conference data 140 via the second multicast group 111, the VCP 108 may assign the second multicast group 111 as the receive multicast group of the first terminal 102.

In operation, to initiate a videoconference, one or more of the terminals 102-104 may register with the VCP 108. For example, each of the terminals 102-104 may send a unicast registration message to the VCP 108. In response to registration messages from the terminals 102-104, the VCP may set up the video conference by assigning each of the terminals 102-104 to a send multicast group and a receive multicast group and may designate the control multicast group 113. For example, the VCP 108 may assign the terminals 102-104 to the send and receive multicast groups and designate the control group using unicast signals (not shown) from the VCP 108 to each terminal 102-104. In an illustrative example, the VCP 108 may assign the terminals to roles to determine the multicast groups that the terminals send to and receive from. The roles of the terminals 102-104 may be determined based on the registration order of the terminals 102-104 or based on other factors, such as default roles assigned to the terminals 102-104. Additional roles may also be defined when additional Coder-Decoders (CODECs) and other features are made available. For purposes of illustration, in FIG. 1, the first terminal 102 is assigned the role of Active Talker, the second terminal 103 is assigned the role of Previous Talker, and the third terminal 104 (and any other terminals that may participate in the video conference and that are not shown) is assigned the role of Listener.

Additionally, during set up of the video conference, the VCP 108 may determine a profile 180 associated with each of the terminals 102-104. For example, the VCP 108 may determine a first communication profile associated with the first terminal 102, a second communication profile associated with the second terminal 103, and a third communication profile associated with the third terminal 104. The profiles 180 may indicate video conference capabilities (such as user configurable options and hardware, software or operational limitations) of the terminals 102-104 or network connections associated with the terminals 102-104. The video conference capabilities may indicate types and rates of information that can be sent by or received and used by each of the terminals 102-104. For example, the profiles 180 may indicate a display frame rate of each of the terminals 102-104, a bandwidth capacity of each of the terminals 102-104, a display resolution of each of the terminals 102-104, a video or audio CODEC used by each of the terminals 102-104, a video or audio data protocol used by each of the terminals 102-104, other information about data that will be transmitted by or that can be received and used by each of the terminals 102-104, or any combination thereof. The profiles 180 may also include information about usage preferences or restrictions associated with each of the terminals 102-104. For example, the profiles 180 may indicate a conference restriction, such as a restriction that only allows a particular terminal to communicate with one or more designated terminals. In another example, restrictions may limit particular uses of particular terminals based on which terminals are participating in the video conference, based on a purpose or subject matter of the video conference, based on a time or duration of the video conference, based on another specified criterion, or any combination thereof. The profiles 180 may further include preferences associated with each of the terminals 102-104. For example, the profiles 180 may indicate a preferred routing for media of the video conference. To illustrate, the preferred routing may indicate that an audio or video portion of the video conference is to be sent to one or more additional devices 190. The one or more additional devices 190 may include devices that provide supplemental services, such as a translating of the media, recording media, converting voice to text, overlaying content, supporting a collaborative computing environment, other supplemental services, or any combination thereof. The additional devices 190 are illustrated in FIG. 1 as receiving data from and sending data to the first multicast group 110; however, in various embodiments, the additional devices 190 may receive data from and send data to any of the multicast groups 110-112 or directly from one or more of the terminals 102-104 or edge devices 170-172.

Based on the profiles 180, the VCP 108 may determine configuration settings 181 associated with each of the terminals 102-104. The VCP 108 may send the determined configuration settings 181 for each terminal 102-104 to the corresponding edge device 170-172 associated with the terminal. For example, the VCP 108 may send configuration settings 181 associated with the first terminal 102 to the first edge device 170 that is associated with the first terminal 102 via a first edge control transmission 160. Likewise, the VCP 108 may send configuration settings 181 associated with the second terminal 103 to the second edge device 171 that is associated with the second terminal 103 via a second edge control transmission 161. Additionally, the VCP 108 may send configuration settings 181 associated with the third terminal 104 to the third edge device 172 that is associated with the third terminal 104 via a third edge control transmission 162. The edge devices 170-172 may be adapted to modify media en route to the associated terminal based on the configuration settings 181. For example, the terminals 102-104 may each encode video conference data using scalable video coding. Scalable video coding may encode video data into a plurality of layers. One or more of the layers may be removed without rendering the video data unusable by another terminal. Removing one or more of the layers may generate modified media that is useable by a particular one of the terminals 102-104. To illustrate, the first edge device 170 may receive video data that has a plurality of layers and may remove one or more of the plurality of layers to generate modified media that is sent to the first terminal 102. Removing the one or more layers may change a bandwidth used to transmit the video content, may change a frame rate of the video content, may change a display resolution of the video content, may change a spatial portion of the video content transmitted (e.g., remove live images and only show graphics), may change other portions of the video content, or any combination thereof.

The configuration settings 181 may also cause the edge devices 170-172 to route the video conference data in a particular manner. For example, the configuration settings 181 cause one or more of the edge devices 170-172 to route at least a portion of the video conference data to one of the additional devices 190. In another example, particular configurations settings 181 may be sent from the VCP 108 to the additional devices 190 to cause the additional devices 190 to provide supplemental services.

The VCP 108 may identify a particular multicast group and instruct each of the terminals 102-104 participating in the video conference call to send its video conference data to the particular multicast group. Video conference data may include video and audio corresponding to the video. The particular multicast group may be a multicast group to which one or more of the terminals 102-104 sends its video conference data (e.g., send multicast group). To illustrate, each of the terminals 102-104 may be assigned a separate multicast group to which video conference data of the terminal is to be sent. Additionally, the VCP 108 may identify a particular multicast group and instruct each of the terminals 102-104 to monitor (e.g., receive) video conference data from the particular multicast group (e.g., receive multicast group). The VCP 108 may instruct the first terminal 102 to send video conference data 150 to the first multicast group 110 and to monitor video conference data 140 from the second multicast group 111 (e.g., to monitor the Previous Talker). The VCP 108 may instruct the second terminal 103 to send video conference data 141 to the second multicast group 111 and to monitor video conference data 151 from the first multicast group 110 (e.g., to monitor the Active Talker). The VCP 108 may instruct the third terminal 104, and any subsequently registered terminals, to not send any video conference data and to monitor video conference data 152 from the first multicast group 110 (e.g., to monitor the Active Talker). Alternately, the VCP 108 may instruct the third terminal 104, and any subsequently registered terminals, to send video conference data to a third multicast group 112.

After the video conference is set up, the VCP 108 may use the control multicast group 113 to send control information to the terminals 102, 104, the edge devices 170-172, the additional devices 190, or any combination thereof. For example, the VCP 108 may send multicast signals 120-122 via the control multicast group 113 to indicate when roles of the terminals (e.g., an Active Talker, a Previous Talker, and a Listener) are to change.

After registering with the VCP 108, each of the terminals 102-104 may start sending an audio portion of its video conference data to the VCP 108. For example, the terminals 102-104 may send the audio portions to the VCP 108 via unicast transmissions. To illustrate, the first terminal 102 may send the audio portion of the video conference data 130 to the VCP 108 via a first unicast transmission. The second terminal 103 may send the audio portion of the video conference data 131 to the VCP 108 via a second unicast transmission. The third terminal 104 may send the audio portion of the video conference data 132 to the VCP 108 via a third unicast transmission. The VCP 108 may monitor the audio portions of the video conference data 130-132 to determine which of the terminals 102-104 is active (e.g., someone near the terminal is talking) For example, the VCP 108 may determine which of the terminals 102-104 is active based on a volume of the audio portion of the video conference data 130-132, a newest to talk (e.g., round robin), a spoken instruction, an electronic instruction, a talk request queue, another determination method, or any combination thereof. After determining which of the terminals 102-104 is active, the VCP 108 may instruct the terminals 102-104 to change roles via the multicast control transmissions 120-122. For example, the VCP 108 may instruct the terminals 102-104 to change the multicast group 110-112 to which video conference data is sent. Alternately, the VCP 108 may instruct the terminals 102-104 to change the multicast group 110-112 from which video conference data is received. Thus, the audio portion of the video conference data 130-132 may be used by the VCP 108 to determine which of the terminals 102-122 should be assigned the role of Active Talker.

During call setup, the first terminal 102 that registers with the VCP 108 may be assigned the role of Active Talker. The Active Talker may be instructed to monitor the second multicast group 111 (e.g., to receive video conference data 140 from the Previous Talker). Additionally, the Active Talker may send video conference data 150 to the first multicast group 110, which all of the other terminals 103-104 may monitor. Thus, a terminal assigned the role of Active Talker (e.g., the first terminal 102 as illustrated in FIG. 1) may not receive video conference data from itself, but instead receives video conference data 140 from the terminal assigned the role of Previous Talker (e.g., the second terminal 103 as illustrated in FIG. 1). The second terminal 103 that registers with the VCP 108 may be assigned the role of Previous Talker. The Previous Talker may send video conference data 141 to the second multicast group 111 (which the Active Talker monitors). The Previous Talker may monitor the first multicast group 110 (e.g., receive video conference data 151). All other terminals, i.e., any terminal that is not assigned the role of Active Talker or Previous Talker, may be assigned the role of Listener. Any terminal assigned the role of Listener may not send any video conference data or may send video conference data 153 to one or more third multicast groups 112. Additionally, Listeners may monitor the first multicast group 110 to receive video conference data 152 from the Active Talker.

Thus, by using the VCP 108 and the multicast groups 110-113, video conferencing may be performed without routing video conference data 140, 141, 150-153 through a centralized video conference system. In addition, bandwidth used to implement the video conference can be reduced by multicasting the video conference data 140, 141, 150-153. Multicasting may enable efficient delivery of the video conference data 140, 141, 150-153 to multiple destinations because the video conference data 140, 141, 150-153 is sent over each link in a network once and the video conference data is replicated only when the links to the multiple destinations split. An added benefit of multicasting is that multicasting scales to a large number of terminals by not requiring prior knowledge of how many terminals there are. Multicast utilizes network infrastructure efficiently by enabling a source terminal to send a packet (e.g., a packet including video conference data) only once, even when the packet is being delivered to a large number of other terminals. Nodes in the network (e.g., the edge devices 170-172) replicate the packet to reach multiple terminals as needed. Thus, using multicasting to deliver the video conference data 140, 141, 150-153 for a video conference call between three or more terminals may result in a significant decrease in the amount of bandwidth used on the network (driving down the cost to deliver the service) as well as a reduction in latency for video conference calls. Additionally, the settings 181 may enable diverse terminals (e.g., terminals with different capabilities or configurations) to communicate without using a centralized device to process the video conference data exchanged by the terminals.

Figure 2:
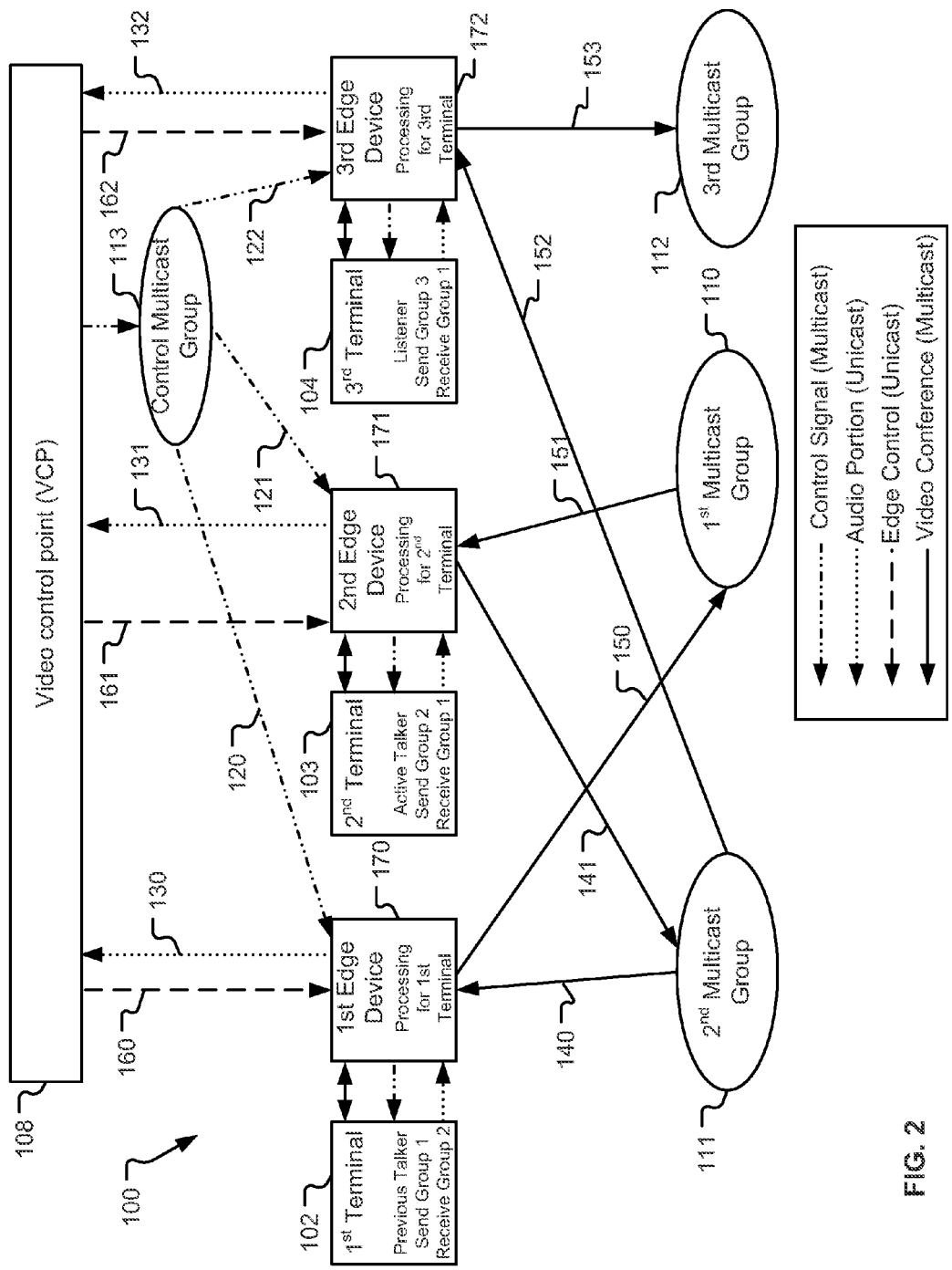
FIG. 2 is a block diagram of a second particular embodiment of a video conferencing system.

Referring to FIG. 2, a second block diagram of the video conferencing system 100 is depicted. The second block diagram of the system 100 illustrates a state of the system after roles of the terminals 102-104 are changed. In particular, as illustrated in FIG. 2, the second terminal 103 has been assigned the role of Active Talker (e.g., in response to a user at the second terminal 103 speaking or requesting to speak).

As described above, the VCP 108 may monitor the unicast audio portion of the video conference data 130-132 from the terminals 102-104. The VCP 108 may determine that the second terminal 103 is active based on the unicast audio portion of the video conference data 131 from the second terminal 103. In response, the VCP 108 may send a control message via a unicast transmission to one or more of the terminals 102-104 or via a message to the control multicast group 113. The message may change the role of the first terminal 102 from Active Talker to Previous Talker. Additionally, the message may change the role of the second terminal 103 to Active Talker. The remaining terminals (e.g., the third terminal 104) may remain Listeners.

Changing the roles of the first terminal 102 and the second terminal 103 may result in each of the terminals 102-104 sending video conference data to a different multicast group, receiving video conference data from a different multicast group, or both. To illustrate, in the embodiment illustrated in FIG. 2, each terminal 102-104 is assigned a send multicast group which does not change when roles change. Rather, to implement changing the roles of the terminals 102-104, one or more of the terminals may change a multicast group that it receives video conference data from. Thus, when the second terminal 103 becomes the Active Talker, the third terminal 172 (and other Listeners) may receive video conference data from the second multicast group 111. The first terminal 102 was already receiving video conference data from the second multicast group 111 (as shown in FIG. 1), so the first terminal 102 continues to receive the video conference data from the second multicast group 111. The second terminal 103 receives video conference data from the Previous Talker, which in this example is the first terminal 102. Accordingly, the second terminal continues to receive video conference data from the first multicast group 110.

In another particular embodiment, changing the roles of the terminals may be implemented by changing which multicast group 110-113 one or more of the terminals 102-104 send video conference data to. For example, the first multicast group 110 may always be associated with the Active Talker and the second multicast group 111 may always be associated with the Previous Talker. That is, whichever terminal 102-104 is the Active Talker may send video conference data to the first multicast group 110, and whichever terminal 102-104 is the Previous Talker may send video conference data to the second multicast group 111. In this embodiment, when the roles of the terminals 102-104 change, the new Active Talker begins sending video conference data to the first multicast group 110 and the new Previous Talker begins sending video conference data to the second multicast group. Listeners continue to monitor the Active Talker via the first multicast group 110. As described above, Listeners may send video conference data to one or more third multicast groups 112, or may send no video conference data.

When the roles of the terminals 102-104 change, the VCP 108 may send new settings 181 to the edge devices 170-172 based on the new roles. Alternately, the settings 181 sent by the VCP 108 to the edge devices 170-172 when the video conference was set up may include information that enables the edge devices 170-172 to process data from each of terminals 102-104. To illustrate, the settings 181 sent to the first edge device 170 during set up of the video conference may include information that enables the first edge device 170 to process video conference data from the second terminal 103, the third terminal 104, or both terminals 103, 104. When a new terminal joins the video conference (e.g., after the video conference has been set up) or when the new terminal becomes the Active Talker, the VCP 108 may send new settings based on the profiles 180 to enable the edge devices 170-172 to process video conference data from the new terminal for use by terminals 102-104 associated with the edge devices 170-172.

Thus, by using the VCP 108 and the multicast groups 110-112, video conferencing calls can be conducted without using a centralized video conferencing bridge. In addition, bandwidth requirements can be reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 3:
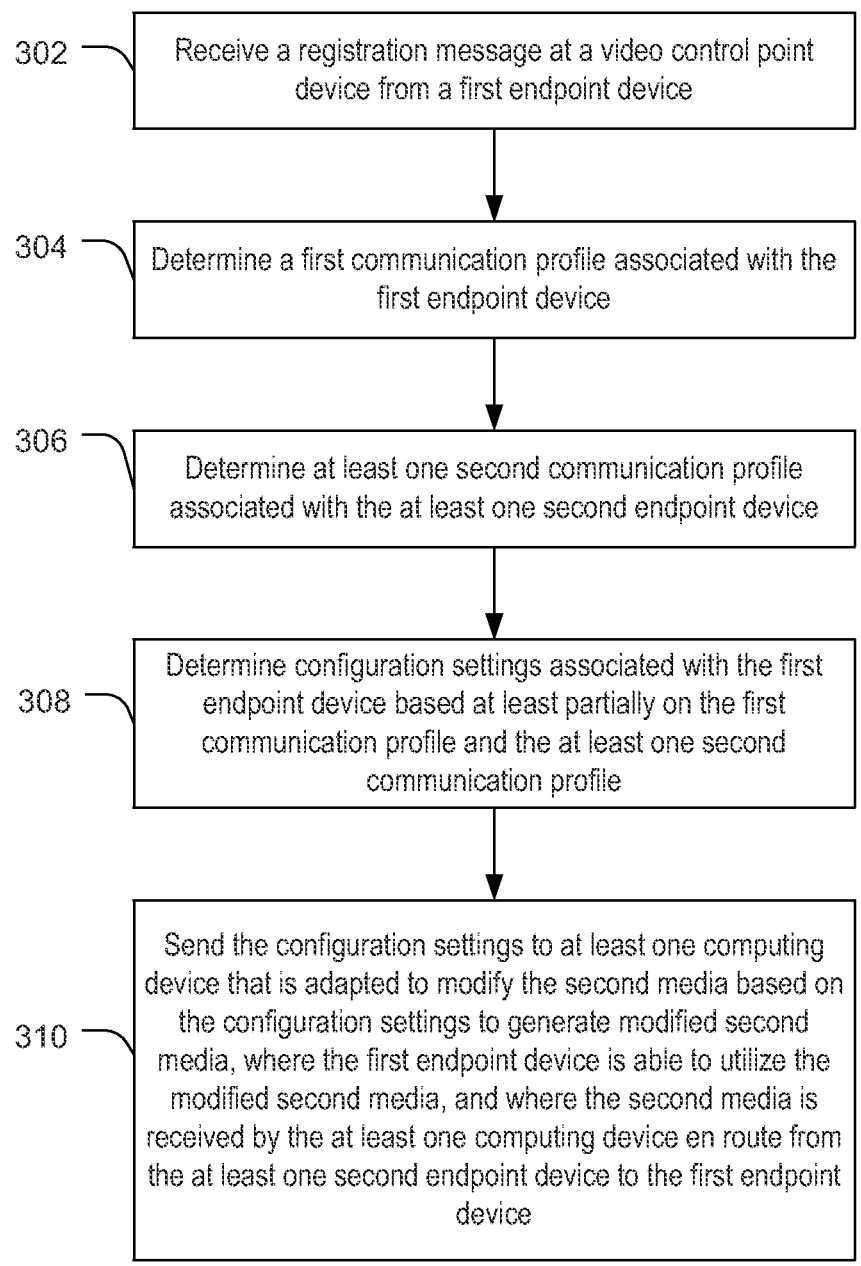
FIG. 3 is a flow diagram of a first particular embodiment of a method to set up a video conference.

FIG. 3 is a flow diagram of a first particular embodiment of a method to set up a video conference. The method may be performed by a Video Control Point (VCP) device, such as the VCP 108 of FIGS. 1 and 2.

The method may include, at 302, receiving a registration message at a VCP device from a first endpoint device. For example, the first endpoint device may be one or the terminals 102-104 of FIGS. 1 and 2. The registration message may request set up of a video conference between the first endpoint device and at least one second endpoint device. In response to the registration message, the VCP device may set up the video conference to enable the first endpoint device to send first media to the at least one second endpoint device without the first media passing through the VCP device en route to the at least one second endpoint device. The video conference may also enable the at least one second endpoint device to send second media to the first endpoint device without the second media passing through the VCP device en route to the first endpoint device. That is, the VCP device may not be a centralized video conferencing bridge that routes data between the endpoint devices.

The method may include, at 304, determining a first communication profile associated with the first endpoint device, and determining at least one second communication profile associated with the at least one second endpoint device, at 306. For example, the communication profiles may include the profiles 180 of FIGS. 1 and 2. The profiles may be stored at a memory accessible to the VCP device or may be generated dynamically by the VCP device by querying the endpoint devices. Configuration settings associated with the first endpoint device may be determined based at least partially on the first communication profile and the at least one second communication profile, at 308. Configuration settings associated with the one or more second endpoint device may also be determined.

The method may include, at 310, sending the configuration settings to at least one computing device that is adapted to modify the second media based on the configuration settings to generate modified second media. The second media may be received by the at least one computing device en route from the at least one second endpoint device to the first endpoint device. For example, the at least one computing device may include one or more of the edge devices 170-172 of FIGS. 1 and 2. The first endpoint device may be able to utilize the modified second media. That is, the modified second media may conform to capabilities and configuration of the first endpoint device.

Figure 4:
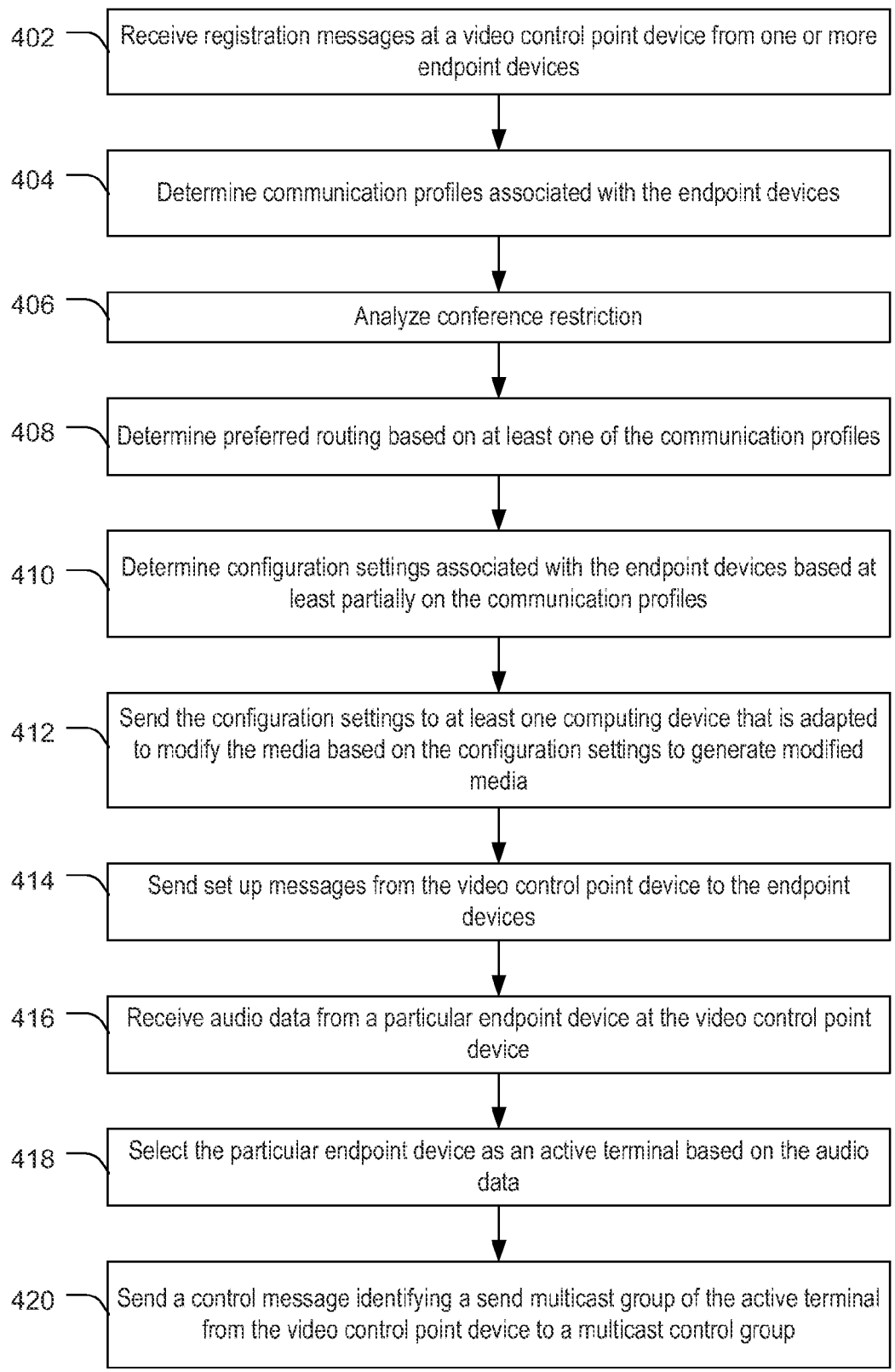
FIG. 4 is a flow diagram of a second particular embodiment of a method to set up a video conference.

FIG. 4 is a flow diagram of a second particular embodiment of a method to set up a video conference. The method may be performed by a Video Control Point (VCP) device, such as the VCP 108 of FIGS. 1 and 2.

The method may include, at 402, receiving a registration message at a VCP device from a first endpoint device. For example, the first endpoint device may be one or the terminals 102-104 of FIGS. 1 and 2. The registration message may request set up of a video conference between the first endpoint device and at least one second endpoint device. In response to the registration message, the VCP device may set up the video conference to enable the first endpoint device to send first media to the at least one second endpoint device without the first media passing through the VCP device en route to the at least one second endpoint device. The video conference may also enable the at least one second endpoint device to send second media to the first endpoint device without the second media passing through the VCP device en route to the first endpoint device.

The method may include, at 404, determining communication profiles associated with the endpoint devices. For example, the communication profiles may include the profiles 180 of FIGS. 1 and 2. The communication profiles may be stored at a memory accessible to the VCP device or may be generated dynamically by the VCP device. For example, the VCP device may query each of the endpoint devices regarding capabilities or configuration of the endpoint device.

The communication profiles may include conference restrictions associated with one or more of the endpoint devices. For example, a conference restriction may include a "whitelist" to indicate that a first endpoint device is only authorized to conduct video conferences with a particular second endpoint device. In another example, a conference restriction may include a "blacklist" to indicate that a first endpoint device is authorized to conduct video conferences with other endpoint devices except for particular endpoint device. In another example, a conference restriction may indicate that the first endpoint device is only authorized to conduct video conferences during specified time periods. In another example, a conference restriction may indicate that the first endpoint device is authorized to (or is not authorized to) conduct video conferences related to particular subject matter. In another example, a conference restriction may indicate that the first endpoint device is only authorized to conduct video conferences that are recorded or are not recorded. Other conference restrictions or combinations of conference restrictions may also be used. The method may include, at 406, analyzing the conference restrictions associated with one or more of the endpoint devices. The conference restrictions may be analyzed to determine whether each of the endpoint devices is authorized to participate in the video conference or to determine specific requirements of the video conference for the endpoints to participate. To illustrate, the conference restrictions may be analyzed to determine whether the video conference can be recorded. When an endpoint device is not authorized to participate in the video conference based on the conference restriction, the configuration settings associated with that endpoint may not be sent, at 412.

The method may include, at 408, determining preferred routing of media of the video conference based on at least one of the communication profiles. For example, one of the communication profiles may indicate that at least a portion of the media of the video conference (e.g., audio data, video data, etc.) should be sent to one or more additional devices besides the endpoint device, such as the one or more additional devices 190 of FIG. 1. The one or more additional devices may process the media to provide supplemental services for the video conference. The supplemental services may include recording, translation, voice-to-text conversion, overlaying content, other services, or any combination thereof. In another example, the preferred routing may indicate particular network connections that should be used to route at least a portion of the data. For example, a particular endpoint device may be associated with more than one network connection (e.g., to more than one video conference service provider or more than one Internet service provider). The preferred routing may include rules or settings that indicate which of the available network connections to use for the video conference. For example, settings may indicate that a particular network connection is always to be used. In another example, a rule may include information to select a lower cost or higher quality network connection. In another example, rules may indicate a particular network connection to use based on a subject matter of the video conference or endpoints participating in the video conference.

The method may include, at 410, determining configuration settings associated with the endpoint devices based at least partially on the communication profiles. The configuration settings may also be determined based on the conference restrictions, the preferred routing, other information about the endpoint devices, or any combination thereof. The configuration settings may be sent to at least one computing device that is adapted to modify the media based on the configuration settings to generate modified media, at 412. The media may be received by the at least one computing device en route between endpoint devices. For example, the at least one computing device may include one or more of the edge devices 170-172 of FIGS. 1 and 2. The media may be modified such that a receiving endpoint device is able to utilize the modified media. That is, the modified media may conform to capabilities and configuration of the receiving endpoint device.

The method may include, at 414, sending set up messages from the VCP device to the endpoint devices. For example, a first set up message may be sent from the VCP device to the first endpoint device via a unicast transmission. The set up messages may includes information identifying a multicast control group, a send multicast group of each endpoint device, and a default receive multicast group of each endpoint device. In response to the set up message, the endpoint device may monitor their assigned default receive multicast group. Each default receive multicast group may correspond to a send multicast group assigned to one of the other endpoint devices. For example, the default receive multicast group of the first terminal 102 of FIG. 1 is the second multicast group 111, to which the second terminal 103 sends video conference data.

The method may include, at 416, receiving audio data from the endpoint devices at the VCP device. A particular endpoint device may be selected as an active terminal based on the audio data, at 418. In response to selecting the particular endpoint device as the active terminal, a control message may be sent to a multicast control group, at 420. The control message may identify a send multicast group of the active terminal, and one or more other endpoint devices may monitor the send multicast group of the active terminal. Alternately, the control message may identify a receive multicast group. The active terminal may send video conference data to the receive multicast group and other endpoint devices may monitor the receive multicast group.

Thus, the VCP device can set up and control a video conferencing call between the endpoint devices without using a centralized video conferencing bridge or multipoint conferencing unit (MCU). Further, video conferencing endpoints of different types or from different vendors, which may otherwise be incompatible, may participate in the video conference without using an MCU. In other systems, an MCU may act as a central control, routing and transcoding point. For example, the MCU may receive data from a first endpoint at a first frame rate and may modify the data for transmission to a second endpoint that uses a second frame rate. Thus, all data communicated between the endpoints may be routed through the MCU, which can be a significant bandwidth burden.

Bandwidth utilized can be further reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 5:
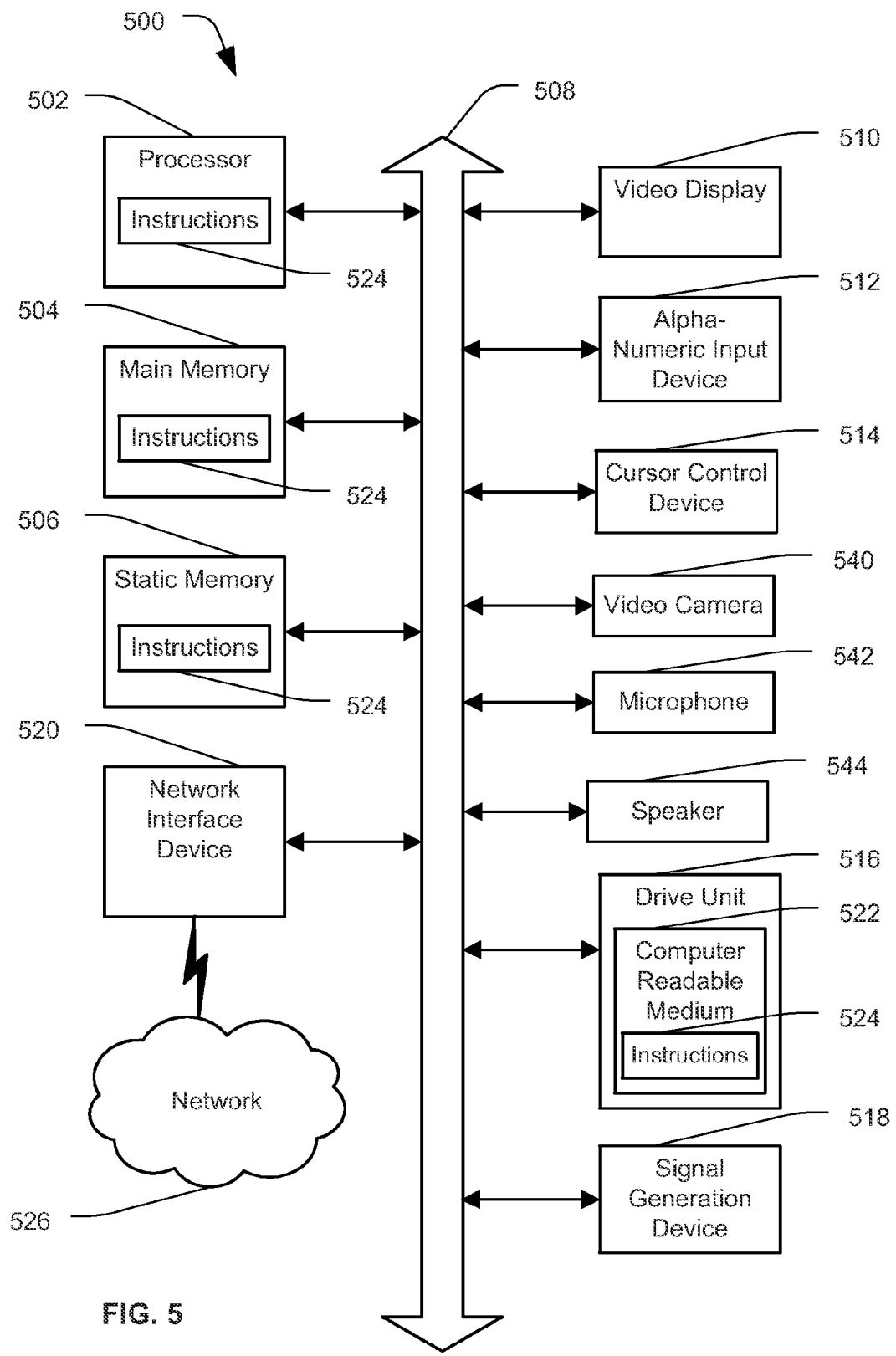
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices. For example, the computer system 500 may include or may be included within any one or more of the terminals 102-104, edge devices 170-172, additional devices 190, or video control point 108 of FIGS. 1 and 2.

In a particular embodiment, the computer system 500 operates in the capacity of a video conferencing terminal, such as the terminals 102-104 of FIGS. 1 and 2. In this embodiment, the computer system 500 may include or be coupled to a video camera 540 to capture video data and a microphone 542 to capture audio data. The computer system 500 may also include or be coupled to a speaker 544 to generate sound based on received audio data and a video display 510 to generate images based on received video data. The computer system 500 can also be implemented as or incorporated into various other devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include or be coupled to the video display unit 510, such as a liquid crystal display (LCD), an organic light emitting diode (OLED), a flat panel display, a cathode ray tube (CRT) display, a solid-state display, or a projection display. Additionally, the computer system 500 may include an input device 512, such as a keyboard, a remote control device, and a cursor control device 514, such as a mouse. The computer system 500 can also include a disk drive unit 516, a signal generation device 518, such as remote control device, and a network interface device 520. The network interface device 520 may be coupled to other devices (such as, one or more of the terminals 102-104, the edge devices 170-172, or the VCP 108 of FIGS. 1 and 2) via a network 526.

In a particular embodiment, as depicted in FIG. 5, the disk drive unit 516 may include a non-transitory computer-readable medium 522 in which one or more sets of instructions 524, e.g., software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include non-transitory computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by the computer system 500. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a non-transitory computer-readable medium that includes instructions 524 or receives and executes instructions 524, so that a device connected to a network 526 can communicate voice, video or data over the network 526. Further, the instructions 524 may be transmitted or received over the network 526 via the network interface device 520.

The term "computer-readable medium" may include a single medium or multiple media, such as a centralized or distributed database, and/or associated caches and servers that store one or more sets of instructions. The term "computer-readable medium" refer to any non-transitory medium that is capable of storing, or encoding a set of instructions 524 for execution by the processor 502 or that cause the computer system 500 to perform any one or more of the methods or operations disclosed herein.

In a particular non-limiting, exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

Software (e.g., the instructions 524) that implement the disclosed methods may be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, HTTP, and Internet Group Management Protocol (IGMP)) and standards for encoding or viewing media content (e.g., MPEG, SMPTE, SVC and H.264) represent examples of the state of the art. Such standards may occasionally be superseded by faster or more efficient equivalents having substantially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method, comprising:
receiving a registration message at a video control point device from a first endpoint device, the registration message requesting set up of a video conference between the first endpoint device and a second endpoint device, wherein, in response to the registration message, the video conference is set up to enable the first endpoint device to send first media to the second endpoint device without the first media passing through the video control point device en route to the second endpoint device and to enable the second endpoint device to send second media to the first endpoint device without the second media passing through the video control point device en route to the first endpoint device;
determining, at the video control point, a first communication profile associated with the first endpoint device and a second communication profile associated with the second endpoint device;
determining, at the video control point, configuration settings associated with the first endpoint device based at least partially on the first communication profile and based at least partially on the second communication profile;
determining a routing of the second media to the first endpoint device based on the first communication profile, the second communication profile, or a combination thereof, wherein the routing includes a computing device to which the second media is to be sent in addition to the first endpoint device; and
sending the configuration settings from the video control point to the computing device when the first endpoint device is authorized to participate in the video conference, wherein the computing device modifies the second media based on the configuration settings to generate modified second media sent to the first endpoint device by the computing device, wherein the first endpoint device is able to utilize the modified second media, and wherein the second media is received by the computing device en route from the second endpoint device to the first endpoint device.

2. The method of claim 1, wherein the registration message is received via a unicast transmission from the first endpoint device to the video control point device.

3. The method of claim 1, further comprising:
determining second configuration settings associated with the second endpoint device based at least partially on the first communication profile and the second communication profile;
determining a second routing of the first media to second endpoint device based on the second communication profile, the first communication profile, or a combination thereof, wherein the second routing includes a second computing device to which the first media is to be sent in addition to the second endpoint device; and
sending the second configuration settings to the second computing device, wherein the second computing device modifies the first media based on the second configuration settings to generate modified first media sent to the second endpoint device by the second computing device, wherein the second endpoint device is able to utilize the modified first media, and wherein the first media is received by the second computing device en route from the first endpoint device to the second endpoint device.

4. The method of claim 1, wherein the second media is encoded into a plurality of layers by the second endpoint device using scalable video coding and wherein the configuration settings include information indicating a layer of the plurality of layers that is to be removed by the computing device to generate the modified second media.

5. The method of claim 4, wherein determining the first communication profile includes determining a display frame rate associated with the first endpoint device, and wherein removing the layer reduces a frame rate of the second media to at least partially satisfy the display frame rate associated with the first endpoint device.

6. The method of claim 4, wherein determining the first communication profile includes determining a bandwidth capacity associated with the first endpoint device, and wherein removing the layer reduces a bandwidth used to transmit the second media to satisfy the bandwidth capacity associated with the first endpoint device.

7. The method of claim 4, wherein determining the first communication profile includes determining a display resolution associated with the first endpoint device, and wherein removing the layer reduces a resolution of the second media to satisfy the display resolution associated with the first endpoint device.

8. The method of claim 1, wherein the first communication profile includes a conference restriction, wherein the method further comprises analyzing the conference restriction before sending the configuration settings.

9. The method of claim 8, wherein, when the first endpoint device is not authorized to participate in the video conference based on the conference restriction, the configuration settings are not sent.

10. The method of claim 1, further comprising receiving a second registration message at the video control point device from a third endpoint device, wherein the second registration message is a request to join the video conference.

11. The method of claim 10, further comprising determining a second routing of the first media to the third endpoint device based on the first communication profile, the second communication profile, a third communication profile associated with the third endpoint device, or a combination thereof.

12. The method of claim 1, wherein the computing device processes the first media to provide supplemental services for the video conference, wherein the supplemental services include recording, translation, voice-to-text conversion, overlaying content, or combinations thereof.

13. A computing device comprising:
a processor; and
a memory accessible to the processor, the memory comprising instructions that, when executed by the processor, cause the processor to perform operations including:
receiving a registration message at a video control point device from a first endpoint device, the registration message requesting set up of a video conference between the first endpoint device and a second endpoint device, wherein, in response to the registration message, the video conference is set up to enable the first endpoint device to send first media to the second endpoint device without the first media passing through the video control point device en route to the second endpoint device and to enable the second endpoint device to send second media to the first endpoint device without the second media passing through the video control point device en route to the first endpoint device;
determining a first communication profile associated with the first endpoint device and a second communication profile associated with the second endpoint device;
determining configuration settings associated with the first endpoint device based at least partially on the first communication profile and based at least partially on the second communication profile;
sending a first set up message to the first endpoint device via a unicast transmission, wherein the set up message includes information identifying a multicast control group, a send multicast group of the first endpoint device, and a default receive multicast group to be monitored by the first endpoint device; and
sending the configuration settings to a computing device that modifies the second media based on the configuration settings to generate modified second media, wherein the first endpoint device is able to utilize the modified second media, and wherein the second media is received by the computing device en route from the second endpoint device to the first endpoint device.

14. The computing device of claim 13, wherein the operations further include receiving a second registration message from a third endpoint device, wherein the second registration message is a request to join the video conference.

15. The computing device of claim 13, wherein the operations further include causing the processor to send a second set up message from the video control point device to the second endpoint device, wherein the second set up message includes information identifying the multicast control group and a send multicast group of the second endpoint device.

16. The computing device of claim 13, wherein the default receive multicast group corresponds to a send multicast group of the second endpoint device.

17. The computing device of claim 13, wherein the computing device comprises a routing device along a communication route between the first endpoint device and the second endpoint device.

18. The computing device of claim 13, wherein the computing device is the first endpoint device.

19. A computing-readable storage device comprising instructions that, when executed by a processor, cause the processor to perform operations including:
receiving a registration message at a video control point device from a first endpoint device, the registration message requesting set up of a video conference between the first endpoint device and a second endpoint device, wherein, in response to the registration message, the video conference is set up to enable the first endpoint device to send first media to the second endpoint device without the first media passing through the video control point device en route to the second endpoint device and to enable the second endpoint device to send second media to the first endpoint device without the second media passing through the video control point device en route to the first endpoint device;
determining a first communication profile associated with the first endpoint device and a second communication profile associated with the second endpoint device;
determining configuration settings associated with the first endpoint device based at least partially on the first communication profile and based at least partially on the second communication profile;
sending the configuration settings to a computing device that modifies the second media based on the configuration settings to generate modified second media, wherein the first endpoint device is able to utilize the modified second media, and wherein the second media is received by the computing device en route from the second endpoint device to the first endpoint device;
receiving audio data from the first endpoint device;

setting the first endpoint device as an active terminal based on the audio data; and sending a control message to a multicast control group, wherein the control message identifies a send multicast group of the active terminal to be monitored by the second endpoint device.

20. The computing-readable storage device of claim 19, wherein the operations further include:

receiving second audio data from the second endpoint device;

setting the second endpoint device as the active terminal based on the second audio data; and sending a control message to the multicast control group, wherein the control message identifies the send multicast group of the active terminal to be monitored by the first endpoint device.

* * * * *